(12) United States Patent
Misheloff et al.

(10) Patent No.: US 6,387,720 B1
(45) Date of Patent: May 14, 2002

(54) WAVEGUIDE STRUCTURES INTEGRATED WITH STANDARD CMOS CIRCUITRY AND METHODS FOR MAKING THE SAME

(75) Inventors: Michael Misheloff, Dublin; Subhas Bothra, Fremont; Calvin Todd Gabriel, Cupertino; Milind Weling, San Jose, all of CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/461,702

(22) Filed: Dec. 14, 1999

(51) Int. Cl.[7] .............................................. H01L 21/00
(52) U.S. Cl. ......................................... 438/31; 438/761
(58) Field of Search ......................... 438/31, 637, 639, 438/648, 700, 761, 778, 696

(56) References Cited

U.S. PATENT DOCUMENTS

| | | | |
|---|---|---|---|
| 4,087,315 A | * 5/1978 | Auracher et al. | |
| 4,820,655 A | * 4/1989 | Noda et al. | 438/31 |
| 5,198,008 A | 3/1993 | Thomas | |
| 5,453,154 A | 9/1995 | Thomas et al. | |
| 5,637,521 A | 6/1997 | Rhodes et al. | |
| 5,753,524 A | * 5/1998 | Bodere et al. | 438/31 |
| 5,770,474 A | * 6/1998 | Kim | 438/31 |
| 6,090,636 A | * 7/2000 | Geusic et al. | 438/31 |
| 6,312,969 B1 | * 11/2001 | Abe | 438/31 |

OTHER PUBLICATIONS

U. Hilleringmann et al., "*Optoelectronic System Integration on Silicon: Waveguides, Photodetectors, and VLSI CMOS Circuits on One Chip*", May 1, 1995, IEEE Transactions on Electron Devices, IEEE Inc. New York, U.S. vol. 42, No. 5, pp. 841–846.

* cited by examiner

*Primary Examiner*—Savitri Mulpuri
(74) *Attorney, Agent, or Firm*—Martine & Penilla, LLP

(57) ABSTRACT

A waveguide structure and method of making a waveguide for communicating optical signals is provided. The waveguide structure is made using standard CMOS fabrication operations and is integrated on the same chip having digital CMOS circuitry. An example method of making the waveguide includes forming a contact through a dielectric layer down to a substrate and coating sidewalls of the contact with a first metallization coating. The contact is then filled with a dielectric material. A partial waveguide structure is formed over the first metallization coating and the dielectric material of the contact. The partial waveguide structure is defined by a waveguide dielectric structure and a second metallization coating that is defined over the waveguide dielectric structure. A third metallization coating is then formed to define spacers along sides of the partial waveguide structure, the first metallization coating, the second metallization coating. The third metallization coating is configured to complete the waveguide structure that is filled with the waveguide dielectric structure. Optical signals can then be propagated through the waveguide structure and can be interfaced with other CMOS digital circuitry.

15 Claims, 5 Drawing Sheets

WAVEGUIDE STRUCTURES INTEGRATED WITH STANDARD CMOS CIRCUITRY AND METHODS FOR MAKING THE SAME

BACKGROUND OF THE INVENTION

1. Field of the Invention

The present invention relates to the manufacture of semiconductor devices. More particularly, the present invention relates to the integration of high speed waveguide structures into standard complementary metal oxide semiconductor (CMOS) chips.

2. Description of the Related Art

Today's semiconductor devices are continually being pushed to meet stricter demands. As devices using this technology inundate the marketplace, consumers place higher demands on the devices. These demands include smaller, more compact devices with greater functionality.

In the search for higher performing circuitry, designers of CMOS circuitry have been looking to other technologies. Such technologies include, for example, radio frequency (RF) technologies, microwave frequency technologies, and optical frequency technologies. A problem, however, is that such technologies are not capable of being integrated using the same process operations implemented in standard CMOS design. As a result, when the need arises for faster performing circuitry, integrated circuit designers are forced to separately design and manufacture separate chips and then integrate them using printed circuit boards (PCBs).

As is well known, separate design and manufacture is required due to the differences in fabrication. That is, standard fabrication operations implemented in making CMOS devices an not readily be applied to the making of RF circuits, microwave circuits, or optical circuits. For example, many RF circuits require that conductive lines be formed as co-axial structures having an inner conductor and an outer shield. Some microwave circuits are made using microstrip technology and steel waveguides with or without filling dielectric materials. Optical devices are also often fabricated using multiple dielectric layers and specially arranged conductors.

Once both the CMOS chip and either an RF device, microwave device, or optical device is ready for integration, substantial work must be performed to ensure that proper communication is made between signals of the two technologies. This testing often requires substantial investment in time and many times produces a device that fails to meet strict performance requirements. This failure in performance is primarily due to the separate manufacturing processes and signal or power losses experienced when the separate chips are interfaced. In addition, separate manufacture and integration also has the downside of increasing engineering costs and thus final product cost.

In view of the foregoing, there is a need for a semiconductor device that can integrate both standard CMOS circuitry along with other non-CMOS high speed circuitry. There is also a need for methods for making the semiconductor device using standard CMOS fabrication processing.

SUMMARY OF THE INVENTION

Broadly speaking, the present invention fills these needs by providing semiconductor devices that incorporate non-CMOS high speed circuit structures along with standard CMOS circuitry. It should be appreciated that the present invention can be implemented in numerous ways, including as a process, an apparatus, a system, a device or a method. Several inventive embodiments of the present invention are described below.

In one embodiment, a method for making a waveguide structure implementing CMOS fabrication processes is disclosed. The method includes providing a substrate having a plurality of active devices fabricated therein and an overlying oxide layer. A contact hole is defined through the oxide layer to define a path down to the substrate. The method then moves to where a first metallization coating is deposited over the oxide layer and in the contact hole. The first metallization coating is removed at a base of the contact hole to define the path down to the substrate and the contact hole is filled with a contact hole dielectric material. A waveguide dielectric is then formed over the first metallization coating and in contact with the contact hole dielectric material. A second metallization coating over the waveguide dielectric is then formed. The method then moves to patterning the second metallization coating, the waveguide dielectric, and the first metallization coating. The patterning is configured to leave a partial waveguide structure that has the contact hole dielectric material in contact with the waveguide dielectric. A third metallization coating is formed over the partial waveguide structure. The third metallization is configured to define metallization spacers that connect the first metallization coating and the second metallization coating and enclose the waveguide dielectric to define the waveguide structure.

In another embodiment, a method of making a waveguide for communicating optical signals is disclosed. The method includes forming a contact through a dielectric layer down to a substrate and coating sidewalls of the contact with a first metallization coating. The contact is then filled with a dielectric material. A partial waveguide structure is formed over the first metallization coating and the dielectric material of the contact. The partial waveguide structure is defined by a waveguide dielectric structure and a second metallization coating that is defined over the waveguide dielectric structure. A third metallization coating is then formed to define spacers along sides of the partial waveguide structure, the first metallization coating, the second metallization coating. The third metallization coating is configured to complete the waveguide structure that is filled with the waveguide dielectric structure. Optical signals can then be propagated through the waveguide structure and interfaced with other CMOS digital circuitry.

In yet another embodiment, a waveguide structure integrated into a semiconductor device and fabricated using standard CMOS processing is disclosed. The waveguide structure includes: (a) a substrate having a light emitting diode fabricated therein; (b) a conductive material coated and dielectric filled contact being in communication with the light emitting diode of the substrate and (c) a conductive material coated dielectric line being in dielectric contact with the conductive material coated and dielectric filled contact, the conductive material coated dielectric line defining the waveguide structure.

The many advantages of the present invention should be recognized. A semiconductor application can now integrate waveguide structures and standard CMOS features on a single chip. As such, designers are no longer required to design and fabricate separate chips having waveguide structures and CMOS chips to make a desired integrated circuit application. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. Therefore, like reference numerals designate like structural elements.

DETAILED DESCRIPTION OF THE PREFERRED EMBODIMENTS

A CMOS semiconductor device having an integrated waveguide structure is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
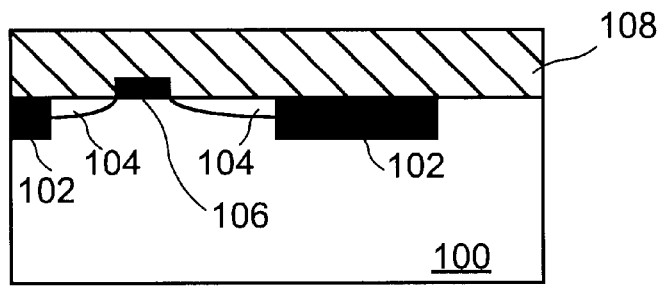
FIG. 1 shows a cross-sectional view of a semiconductor device during its initial standard CMOS processing, in accordance with one embodiment of the present invention.

FIG. 1 shows a cross-sectional view of a semiconductor device during its initial standard CMOS processing, in accordance with one embodiment of the present invention. The device is processed from a semiconductor substrate 100, which includes a plurality of active regions in which transistor devices are fabricated. In this example, shallow trench isolation (STI) regions 102 are provided to isolate an exemplary transistor that includes source and drain regions 104, and a gate electrode 106. An oxide layer 108 is deposited over the semiconductor substrate 100 once the various transistors have been defined throughout the IC device. In this embodiment, the oxide layer 108 is deposited to a thickness ranging between about 5,000 Å and about 15,000 Å, with a preferred thickness of about 10,000 Å.

Figure 2:
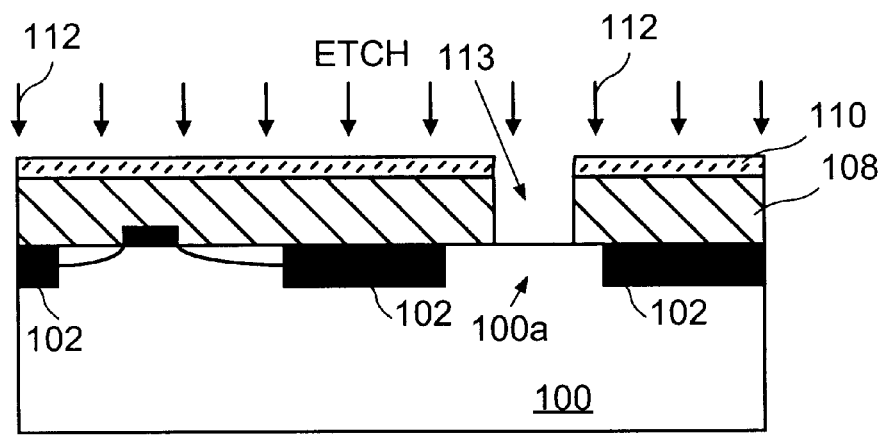
FIG. 2 shows a cross-sectional view of the semiconductor substrate of FIG. 1 after an etching operation is performed, in accordance with one embodiment of the present invention.
Figure 11A:
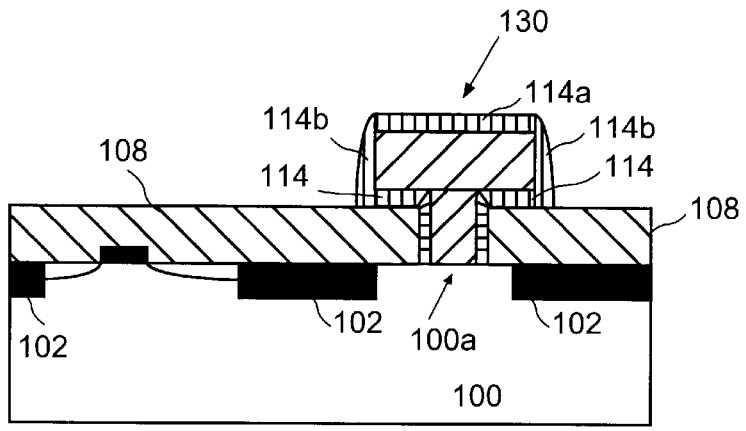
FIG. 11A illustrates the resulting waveguide structure, which was fabricated using standard CMOS fabrication operations, in accordance with one embodiment of the present invention.
Figure 11B:
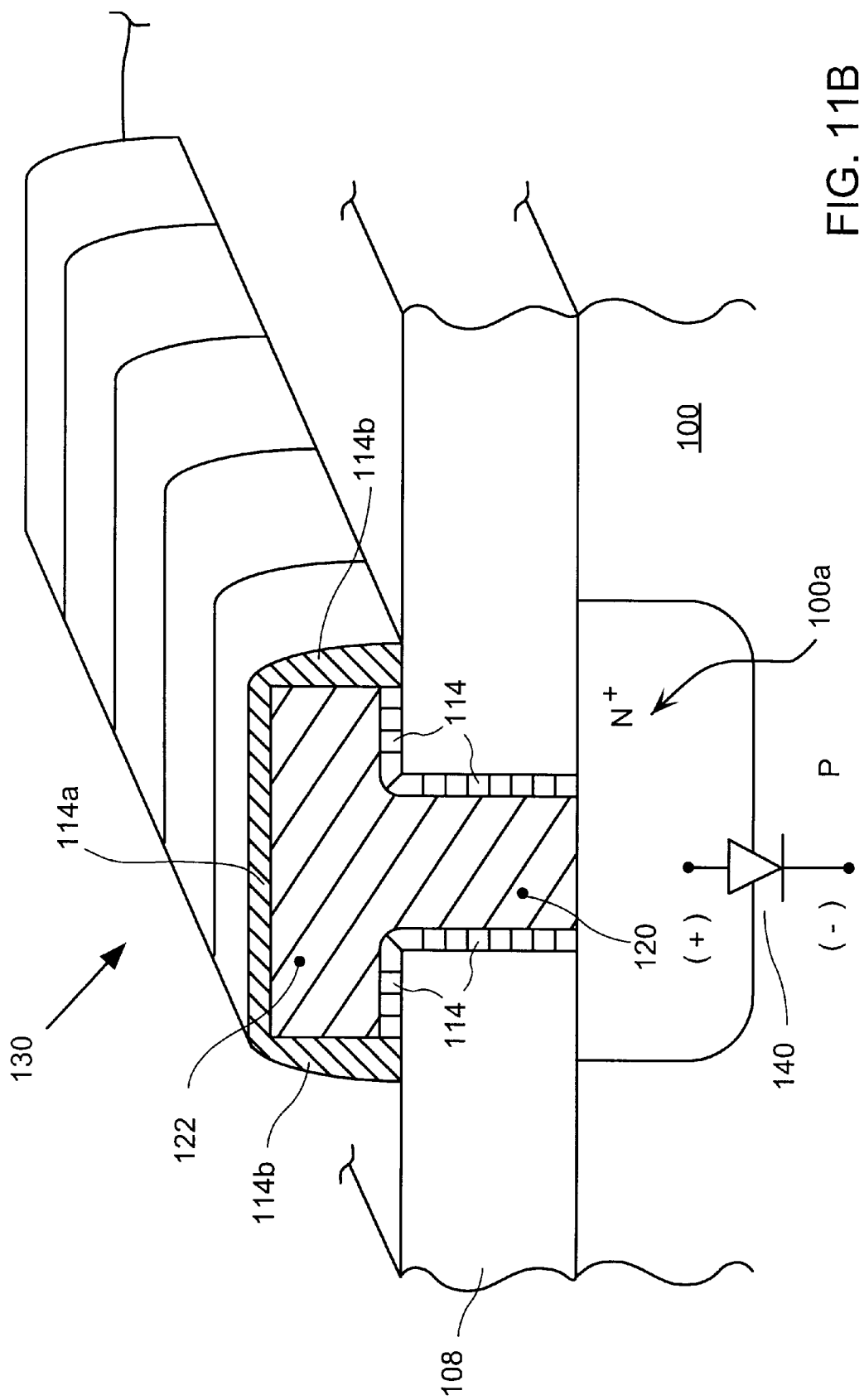
FIG. 11B shows a more detailed diagram of the waveguide structure of FIG. 11A, in accordance with one embodiment of the present invention.

FIG. 2 shows a cross-sectional view of the semiconductor substrate 100 of FIG. 1 after an etching operation is performed in accordance with one embodiment of the present invention. As shown, a photoresist mask 110 is patterned over the oxide layer 108 to define a contact down to the semiconductor substrate 100. An etching operation 112 is implemented to etch through the oxide layer 108, which is preferably silicon dioxide ($SiO_2$) material or other suitable inorganic or organic dielectric. The etching operation defines the contact down to the semiconductor substrate 100 at a region 100a, which will be used to form a light-emitting diode (LED) as shown in FIG. 11B below. The wave guide of the present invention can also implement a laser diode which can be fabricated into the semiconductor substrate 100 to generate optical signals, using well known techniques.

Figure 3:
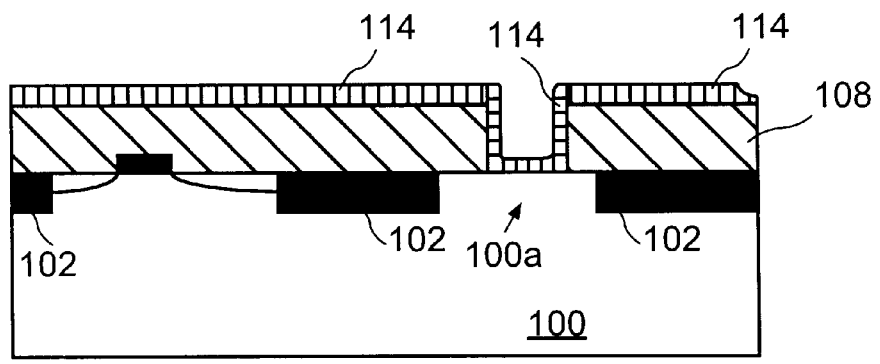
FIG. 3 shows the formation of a TiN coating over an oxide layer and in a contact that interfaces with the substrate.

Once the etch operation 112 is complete in FIG. 2, the process moves to FIG. 3 where a titanium nitride (TiN) layer 114 is deposited over the oxide layer 108 and into the contact 113. As shown, the walls of the contact 113 including the base, are deposited with the TiN layer 114. Preferably, the TiN layer 114 is deposited to a thickness ranging between about 200 Å and about 1,000 Å, and more preferably, to a thickness of about 500 Å. Preferably, the resistivity of the TiN material will be between about 50 micro-ohms per cm to about 1,000 micro-ohms per cm, and most preferably, 100 micro-ohms per cm.

Figure 4:
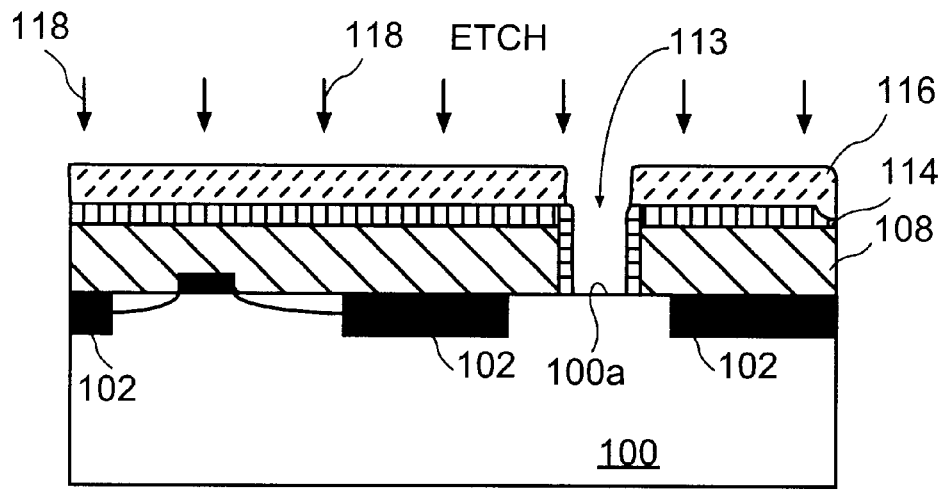
FIG. 4 illustrates an etching operation that is configured to remove a portion of the TiN material in the contact, in accordance with one embodiment of the present invention.
Figure 5:
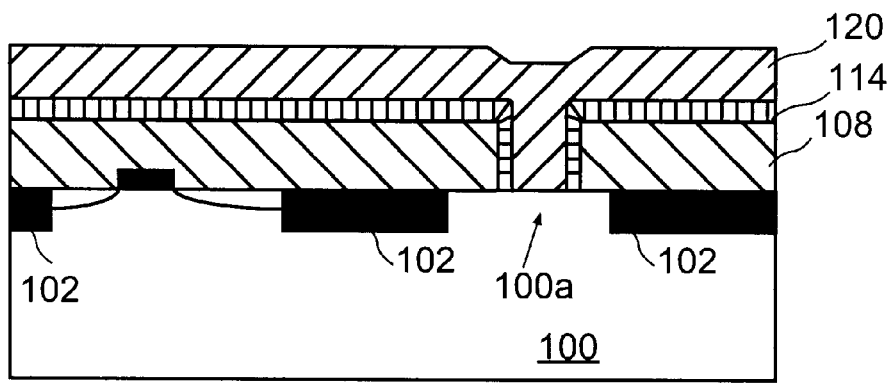
FIG. 5 illustrates the deposition of a dielectric layer into the contact to make a dielectric connection to the substrate, in accordance with one embodiment of the present invention.

FIG. 4 illustrates an etching operation that is configured to remove a portion of the TiN material 114, in accordance with one embodiment of the present invention. As shown, a photoresist mask 116 is formed over the TiN layer 114 in a manner that exposes the region 100a of the semiconductor substrate 100 within the contact 113. By removing the TiN material 114 from the base of the contact 113, a connection of the waveguide to be formed can be made to the semiconductor substrate 100 and its associated light emitting structure. Now, an oxide layer 120 is deposited over the TiN layer 114 and into the contact 113 such that the oxide layer 120 is in direct contact with the semiconductor substrate 100 at region 100a. The oxide deposition is preferably a high density plasma (HDP) oxide deposition that is well configured to fill in the contact 113 down to the semiconductor substrate 100.

Figure 6:
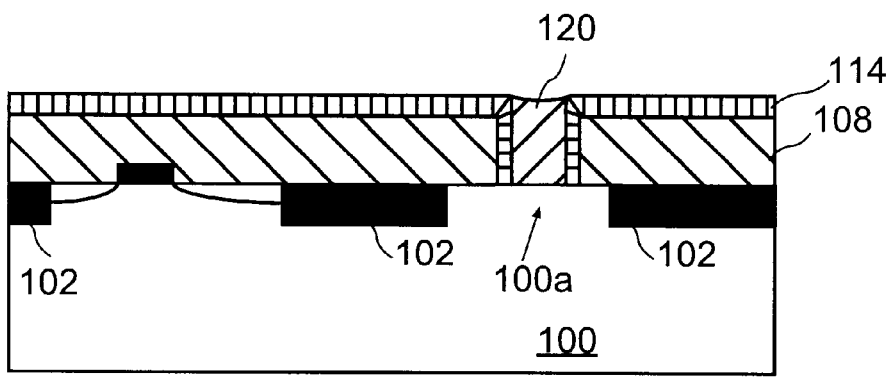
FIG. 6 illustrates the resulting structure of FIG. 5 after a CMP operation is implemented to remove excess dielectric material, in accordance with one embodiment of the present invention.
Figure 7:
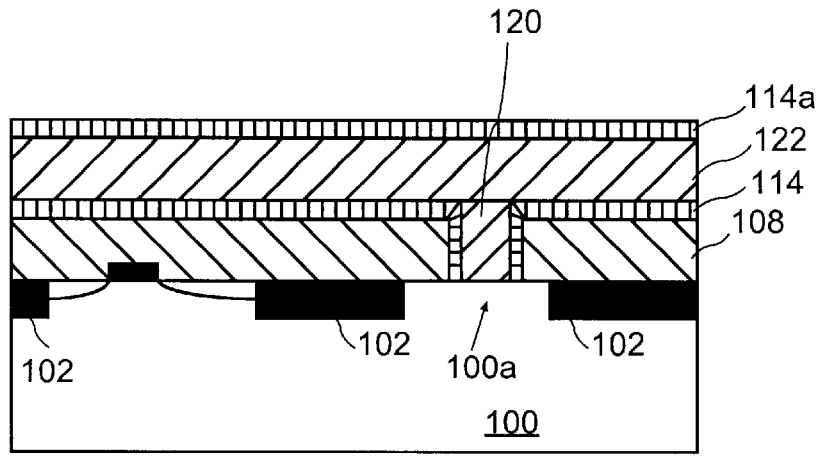
FIG. 7 illustrates the resulting structure after a dielectric layer and a second coating of TiN is formed over the structure of FIG. 6, in accordance with one embodiment of the present invention.

At this point, a chemical mechanical polishing (CMP) operation is performed to remove the oxide layer 120 down to the TiN layer 114 as shown in FIG. 6. As shown in FIG. 7, another oxide layer 122 is deposited over the TiN layer 114 and in dielectric contact with the oxide material 120 contained within the contact 113. Preferably, the oxide layer 122 has a thickness ranging between about 5,000 Å and about 15,000 Å. Once the oxide layer 122 has been deposited to a suitable thickness to define the depth of the waveguide being formed, a TiN layer 114a is deposited over the oxide layer 122. Preferably, the TiN material 114a will have a thickness ranging between about 200 Å and about 1,000 Å, and most preferably will have a thickness of about 500 Å as does the TiN layer 114.

Figure 8:
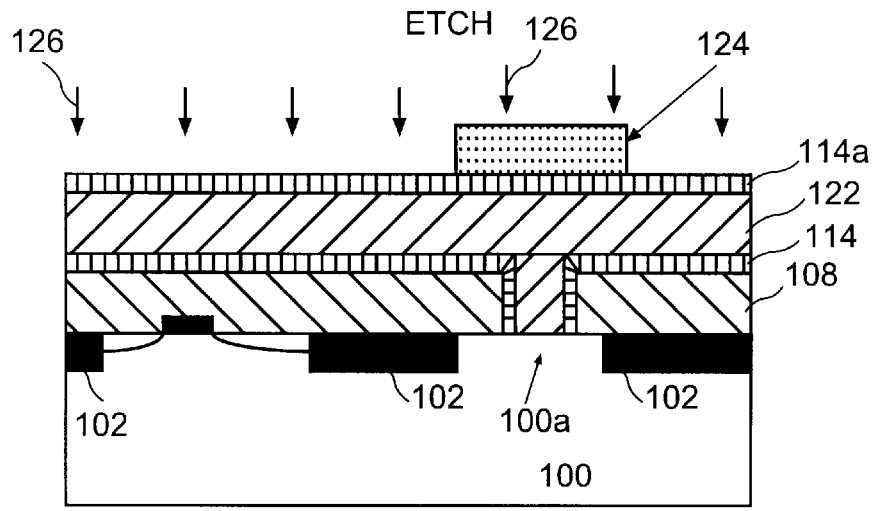
FIG. 8 shows the formation of photoresist mask used to define the location of a partial waveguide, in accordance with one embodiment of the present invention.
Figure 9:
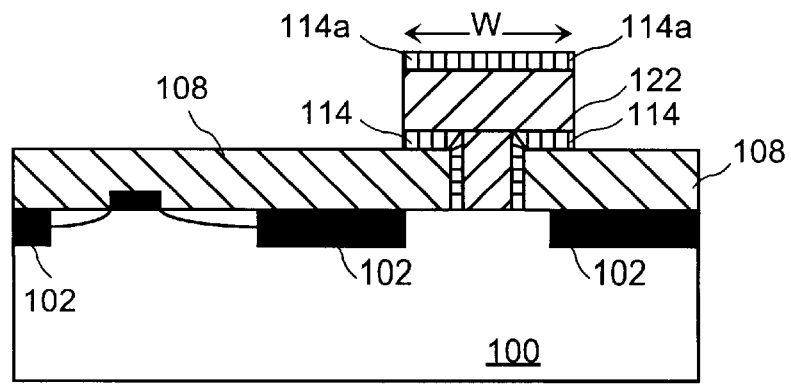
FIG. 9 shows the resulting partial waveguide structure having a waveguide dielectric structure, in accordance with one embodiment of the present invention.

The width of the waveguide will be defined by patterning a photoresist mask 124 over the TiN layer 114a as shown in FIG. 8. Once the photoresist mask 124 has been defined over the TiN layer 114a, an etch operation 126 is performed to remove the exposed TiN layer 114a, the oxide layer 122, and the TiN layer 114. The photoresist mask 124, therefore defines a width W of the waveguide as shown in FIG. 9. Preferably, the width can be selected to be between about 0.5 micron and about 50 microns, and most preferably, about 1 micron. Exemplary etching operations performed through the TiN layer 114a, the oxide layer 122, and the TiN layer 114 are illustrated in Table A below. The etched oxide line that is coated with conductive material on top and on the bottom. At this point, the waveguide is not yet defined since the waveguide needs to be surrounded by a metallization coating on all sides.

TABLE A

| Parameters | TiN | Oxide | TiN |
|---|---|---|---|
| Pressure (mT) | ~10 | ~30 | ~10 |
| RF-Top (W) | ~450 | ~450 | ~450 |
| RF-Bottom (W) | ~135 | ~300 | ~135 |
| BCl3 (sccm) | ~60 | 0.0 | ~60 |
| Cl2 (sccm) | ~60 | 0.0 | ~60 |
| N2 (sccm) | ~11 | 0.0 | ~11 |
| CF4 (sccm) | 0.0 | ~30 | 0.0 |
| Ar (sccm) | 0.0 | ~100 | 0.0 |
| CHF3 (sccm) | 0.0 | ~90 | 0.0 |
| He Clamp (T) | ~10 | ~10 | ~10 |
| Completion Time | Time ~20 s | Time ~20 s | Time ~10 s |

Figure 10:
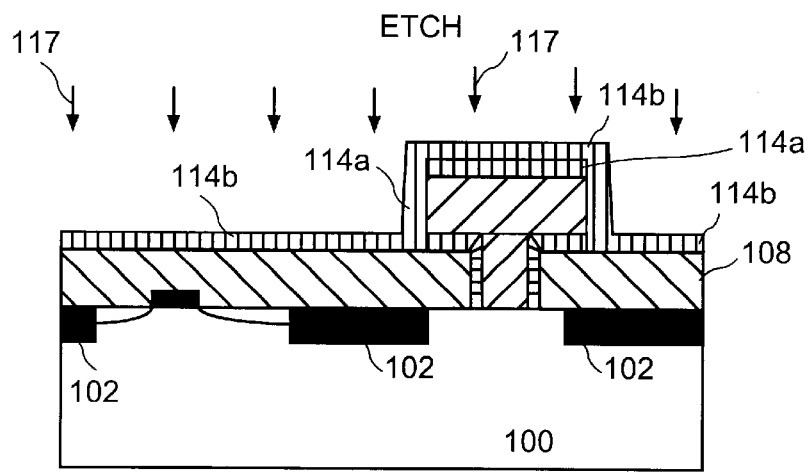
FIG. 10 shows the structure of FIG. 9 after a third TiN coating is deposited over the partial waveguide structure, in accordance with one embodiment of the present invention.

In a next operation, another TiN layer 114b is blanket deposited over the top of the oxide layer 108, and the TiN layer 114a of the partial waveguide structure as shown in FIG. 10. In this embodiment, the thickness of the TiN layer 114b will preferably be between about 200 Å and about 2,000 Å, and most preferably, about 1,000 Å. Once the TiN layer 114b has been deposited, an etch operation 117 is performed to remove the TiN layer 114b from over the oxide layer 108 and the TiN layer 114a. The effect of the etch operation 117 will be to leave TiN spacers 114b as shown in FIG. 11A around the sides of the oxide layer 122, thus enclosing the dielectric material 122 and defining a waveguide structure 130. As is well known, waveguide structures consist of a hollow or dielectric filled conducting tube, square, or rectangle. Electromagnetic waves above a cutoff frequency can be propagated along the waveguide with electric and magnetic fields that are confined within the waveguide. Advantageously, the waveguide 130 of the present invention can be fabricated using the same standard CMOS process operations used to fabricate digital circuitry.

Figure 12:
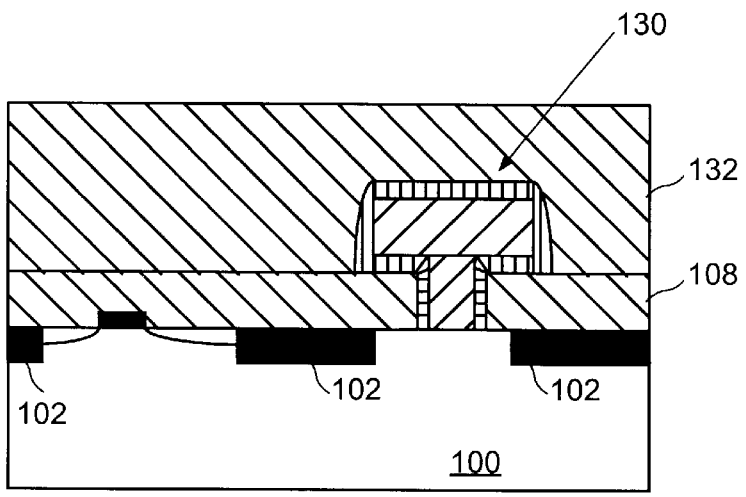
FIG. 12 shows the formation of a dielectric layer over the waveguide structure in order to continue with standard CMOS processing, in accordance with one embodiment of the present invention.

As shown, the waveguide structure 130 is now surrounded by metallization material which in this case, is preferably TiN. It should be understood that any other suitable metallization material may also be used to defined the spacers of the waveguide 130. For example, other suitable materials may be selected from a group consisting of titanium nitride (TiN), copper (Cu), gold (Au), tungsten (W), and tantalum nitride (TaN). Once the waveguide structure 130 has been formed, an oxide layer 132 can be formed over the waveguide structure as shown in FIG. 12, and any remaining standard processing steps can be completed as desired.

FIG. 11B shows a more detailed diagram of the waveguide structure 130, in accordance with one embodiment of the present invention. The wave guide structure 130 is shown having spacers defined by the TiN material 114, 114a, and 114b. Contained within the waveguide structure 130 is an oxide material 122 in the form of a line, and oxide material 120 that extends down to and in contact with the region 100a of the semiconductor substrate 100. In this exemplary embodiment, the semiconductor substrate 100 is preferably a P-type substrate that is negatively charged. Defined in the region 100a is an N+doped well that is used to define a diode. The N+doped well can then be connected to a positive voltage supply during operation.

To pictorially illustrate a location of the diode 140, a simplified diagram illustrates how the diode is defined at the interface of the N+doped well and the P-type substrate. Thus, the diode 140 can generate the necessary light and function as a light-emitting diode (LED) in order to propagate optical signals through the dielectric material 120 and 122 of the waveguide structure 130. In one embodiment, the waveguide structure 130 can be used to propagate optical signals having a frequency greater than about $10^{14}$ hertz. The $10^{14}$ hertz frequency of the optical signal is the cutoff frequency for a waveguide structure 130 when the largest dimension (either width or height) is about 1 micron. If it is desired to propagate an optical signal grater than $10^{13}$ Hz then the largest dimension (e.g., width) must be greater than about 10 microns. As can be appreciated therefore, modifications to the size of the waveguide structure 130 enable functionality for different cutoff frequencies.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for making a waveguide structure implementing CMOS fabrication processes, the method comprising:

providing a substrate having a plurality of active devices fabricated therein and an overlying oxide layer;

defining a contact hole through the oxide layer to define a path down to the substrate;

depositing a first metallization coating over the oxide layer and in the contact hole;

removing the first metallization coating at a base of the contact hole to define the path down to the substrate;

filling the contact hole with a contact hole dielectric material;

forming a waveguide dielectric over the first metallization coating and in contact with the contact hole dielectric material;

forming a second metallization coating over the waveguide dielectric;

patterning the second metallization coating, the waveguide dielectric, and the first metallization coating, the patterning being configured to leave a partial waveguide structure that has the contact hole dielectric material in contact with the waveguide dielectric; and forming a third metallization coating over the partial waveguide structure, the third metallization being configured to define metallization spacers that connect the first metallization coating and the second metallization coating and to enclose the waveguide dielectric and define the waveguide structure.

2. A method for making a waveguide structure implementing CMOS fabrication processes as recited in claim 1, wherein the substrate includes one of a light emitting diode and a laser diode at the path defined to the substrate.

3. A method for making a waveguide structure implementing CMOS fabrication processes as recited in claim 1, wherein the one of the light emitting diode and the laser diode is configured to generate an optical signal that propagates through the contact hole dielectric material and the waveguide dielectric of the waveguide structure.

4. A method for making a waveguide structure implementing CMOS fabrication processes as recited in claim 1, wherein the first metallization coating, the second metallization coating, and the third metallization coating are each selected from a group consisting of titanium nitride (TiN), copper (Cu), gold (Au), tungsten (W), and tantalum nitride (TaN).

5. A method for making a waveguide structure implementing CMOS fabrication processes as recited in claim 4, wherein when the first metallization coating, the second metallization coating, and the third metallization coating are each titanium nitride (TiN), the coatings have a thickness ranging between about 200 Angstroms and about 2,000 Angstroms.

6. A method for making a waveguide structure implementing CMOS fabrication processes as recited in claim 5, wherein the titanium nitride (TiN) has a resistivity ranging between about 50 micro-ohms/centimeter and about 1000 micro-ohms/centimeter.

7. A method for making a waveguide structure implementing CMOS fabrication processes as recited in claim 1, wherein the waveguide structure is an optical waveguide structure capable of carrying optical signals having a frequency that is greater than $10^{14}$ Hz.

8. A method for making a waveguide structure implementing CMOS fabrication processes as recited in claim 7, wherein the waveguide dielectric has a thickness ranging between about 5,000 Angstroms and about 15,000 Angstroms, and a width that is between about 5,000 Angstroms and about 50,000 Angstroms.

9. A method of making a waveguide for communicating optical signals, comprising:

forming a contact through a dielectric layer down to a substrate;

coating sidewalls of the contact with a first metallization coating;

filling the contact with a dielectric material;

forming a partial waveguide structure over the first metallization coating and the dielectric material of the contact, the partial waveguide structure being defined by a waveguide dielectric structure and a second metallization coating defined over the waveguide dielectric structure; and forming a third metallization coating to define spacers along sides of the partial waveguide structure, the first metallization coating, the second metallization coating and the third metallization coating defining the waveguide that is filled with the waveguide dielectric structure.

10. A method of making a waveguide for communicating optical signals as recited in claim 9, wherein the operation of coating sidewalls of the contact with the first metallization coating includes, depositing the first metallization coating over the dielectric layer and in the contact;

etching away the first metallization coating at a base of the contact to define a non-metal path to the substrate.

11. A method of making a waveguide for communicating optical signals as recited in claim 10, wherein the filling of the contact with the dielectric material includes, depositing an HDP oxide over the first metallization coating and into the contact; and polishing away the HDP oxide from over the first metallization coating, such that the HDP oxide that remains in the contact defines the dielectric material contained within the contact.

12. A method of making a waveguide for communicating optical signals as recited in claim 10, wherein the forming of the partial waveguide structure includes, depositing an oxide layer over the first metallization coating;

depositing the second metallization coating over the oxide layer; and forming a photoresist mask over the second metallization coating to define a location for the partial waveguide structure; and etching the second metallization coating, the oxide layer and the first metallization coating not covered by the photoresist mask.

13. A method of making a waveguide for communicating optical signals as recited in claim 10, wherein the forming of a third metallization coating to define spacers along sides of the partial waveguide structure includes, depositing the third metallization coating over the second metallization coating of the partial waveguide structure and over the dielectric layer; and blanket etching the third metallization coating to remove the third metallization coating from over the dielectric layer and partially from over the second metallization coating of the partial waveguide structure, the blanket etching being configured to define the spacers and thus define the waveguide.

14. A method of making a waveguide for communicating optical signals as recited in claim 10, wherein a light emitting diode is formed in the substrate and the light emitting diode optically interfaces with the dielectric material in the contact and the waveguide dielectric structure of the waveguide.

15. A method of making a waveguide for communicating optical signals as recited in claim 9, wherein the first metallization coating, the second metallization coating, and the third metallization coating are each selected from a group consisting of titanium nitride (TiN), copper (Cu), gold (Au), tungsten (W), and tantalum nitride (TaN).

* * * * *